United States Patent [19]

Tran

[11] Patent Number: 5,574,458
[45] Date of Patent: Nov. 12, 1996

[54] AUTOMATIC RF COUNTERMEASURES DISPENSING MODULE CONTROLLER

[75] Inventor: My Tran, Albuquerque, N.M.

[73] Assignee: Honeywell Inc., Minneapolis, Minn.

[21] Appl. No.: 308,161

[22] Filed: Jun. 30, 1994

Related U.S. Application Data

[63] Continuation of Ser. No. 977,327, Nov. 17, 1992, abandoned.

[51] Int. Cl.$^6$ ........................................ G01S 7/38
[52] U.S. Cl. ................................. 342/13; 342/14
[58] Field of Search ........................ 342/13, 14, 15, 342/12

[56] References Cited

U.S. PATENT DOCUMENTS

| | | | |
|---|---|---|---|
| 4,700,191 | 10/1987 | Manor | 342/13 |
| 5,069,109 | 12/1991 | Lavan, Jr. | 89/1.11 |
| 5,122,801 | 6/1992 | Hughes | 342/13 |
| 5,287,110 | 2/1994 | Tran | 342/13 |
| 5,291,818 | 3/1994 | Bannasch | 89/1.11 |
| 5,406,286 | 4/1995 | Tran et al. | 342/13 |
| 5,410,313 | 4/1995 | Tran | 342/13 |
| 5,457,460 | 10/1995 | Tran et al. | 342/13 |

*Primary Examiner*—John B. Sotomayor
*Attorney, Agent, or Firm*—Kenneth J. Johnson; George A. Leone, Sr.

[57] ABSTRACT

Automatic countermeasures dispensing module controller for radio frequency countermeasures processes information generated by a missile approach detector and radio frequency receivers which is correlated to generate a radio frequency countermeasures dispensing command. A countermeasures module is connected to provide effective countermeasures against radio frequency guided missiles. Voice warning messages are generated and a threat display symbol is generated on a cockpit display system that provides an audio and visual monitor of the threat. The number of countermeasures employed is counted. If a radar warning receiver or pulsed radar jammer is in operation and a missile approaching event is detected, the region of missile approach is read from a missile approach detector. The missile threat is displayed and correlated with the radar warning receiver or pulsed radar jammer for the indicated region with a missile approach detector. If the correlation is positive then a RF dispensing command is generated to dispense an RF countermeasures module.

20 Claims, 9 Drawing Sheets

AUTOMATIC RF COUNTERMEASURES DISPENSING MODULE CONTROLLER

UNITED STATES GOVERNMENT RIGHTS

The United States Government has acquired certain rights in this invention through government Contract No, DAA B07-87-C-H041 awarded by the Department of the Army.

This application is a continuation, of application Ser. No. 07/977,327, filed Nov. 17, 1992 now abandoned.

BACKGROUND OF THE INVENTION

1. Field of the Invention

The invention relates to an aircraft survivability system countermeasures dispensing module and more particularly to an automatic RF countermeasures dispensing module based on an integrated aircraft survivability equipment system.

2. Discussion of the Prior Art

In the prior art, individual aircraft survivability equipment (ASE) sensors are used as stand-alone systems. The use of such systems in a stand-alone manner results in high pilot workloads. Further, in such systems only a limited amount of threat data is presented to the pilot. Data provided by various ASE subsystems such as pulsed radar jammers, CW radar jammers and missile approach detectors have previously not been used to provide a comprehensive and coherent picture of the threat environment. Thus prior art systems often do not present adequate data in a readily understood format to enable the pilot to quickly and completely assess a given threat environment.

The prior art has never used such an integrated ASE system to counter an incoming RF-guided missile.

SUMMARY OF THE INVENTION

The invention provides an automatic RF countermeasures dispensing capability to counter the incoming RF-guided missile. The threat information provided by the Radar Warning Receiver and Pulsed Radar Jammer is pre-processed and then correlated with information provided by the Missile Approach Detector. If the region of the incoming missile is correlated with a region having active RF activities, then a RF-CM command is sent to dispense RF decoy and chaff. The invention also provides the following functions: monitoring RF-CM count, generating voice messages for missile warnings, and generating threat symbols for display on the threat concentric circle.

It is one object of the invention to provide an effective capability to counter the RF-guided missile that directly contributes to an increase in aircraft survivability.

It is another object of the invention to alert the crew of an incoming threat so that evasive action may be taken to increase the likelihood of aircraft survival.

It is another object of the invention to reduce pilot workload which helps increase productivity in the cockpit.

Other objects, features and advantages of the present invention will become apparent to those skilled in the art through the description of the preferred embodiment, claims and drawings herein where like numerals refer to like elements.

DETAILED DESCRIPTION OF THE PREFERRED EMBODIMENT

Figure 1:
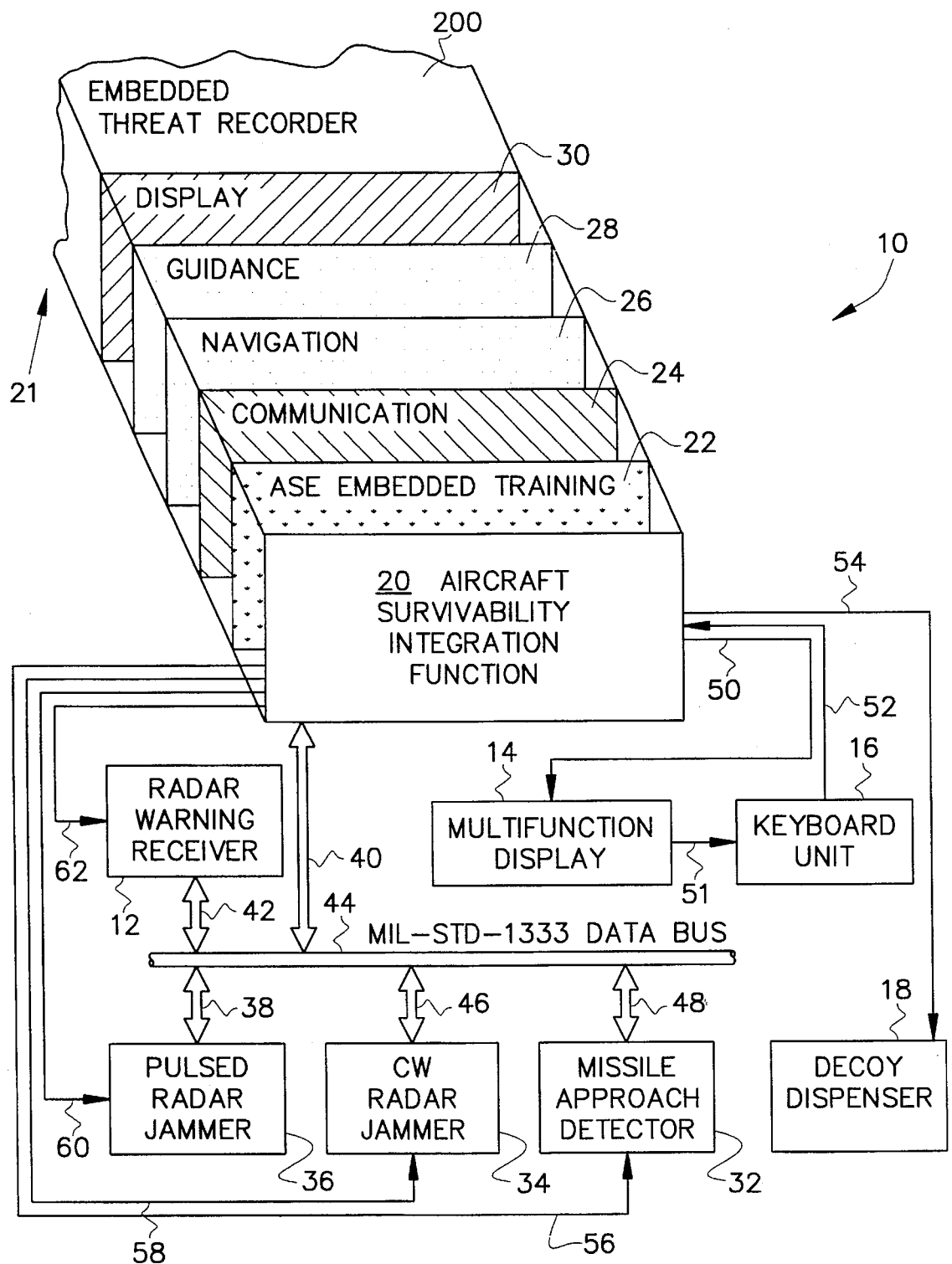
FIG. 1 shows a high level system diagram of one embodiment of the aircraft survivability integration equipment system as employed by the invention.

Now referring to FIG. 1, a high level system diagram of one embodiment of the aircraft survivability integration equipment system 10 as employed by the invention is shown. Aircraft survivability system 10 includes aircraft survivability integration functions 21, a multifunction display 14, a keyboard unit 16, a continuous wave (CW) radar jammer 34, a missile approach detector 32, a pulsed radar jammer 36, a radar warning receiver 12 and a decoy dispenser 18. The aircraft survivability integration functions 21 further include an aircraft survivability integration function 20, an aircraft survivability equipment embedded training apparatus 22, communication apparatus 24, navigation apparatus 26, guidance apparatus 28, display apparatus 30 and an embedded threat data recorder 200. The radar warning receiver 12, pulsed radar jammer 36, CW radar jammer 34, missile approach detector 32, multifunctional display 14, keyboard unit 16 and decoy dispenser 18 are standard units. The radar warning receiver 12, pulsed radar jammer 36, CW radar jammer 34 and missile approach detector 32 all communicate with each other and the aircraft survivability integration functions 21 through a data bus 44. The data bus 44 may advantageously be a MIL standard 1553 data bus or equivalent. In one example of the invention, the radar warning receiver (RWR) 12 communicates with the data bus through communication lines 42, the pulsed radar jammer 36 communicates with the data bus through communication lines 38, and the CW radar jammer 34 communicates to the data bus through communication lines 46, and missile approach detector 32 by communication lines 48. In this way, the sensors in the system which comprise the radar warning receiver 12, pulsed radar jammer 36, CW radar jammer 34 and missile approach detector 32 can receive and transmit data to the aircraft survivability integration functions 21. In addition, the aircraft survivability integration functions 21 may be hardwired to the plurality of sensors. This introduction of hardwired lines to the individual sensors provides a redundancy feature in the system which guards against failure of the data bus 44. For example, the radar warning receiver 12 may be wired by lines 62 into the aircraft survivability integration function 20, the pulsed radar jammer 36 by lines 60, the CW radar jammer 34 by lines 58 and the missile approach detector 32 by lines 56. Hard wire and bus interfaces are typically provided with such ASE devices as are conventionally available.

The multifunction display 14 is controlled by the display apparatus 30 and is wired to the display apparatus 30 in an aircraft survivability integration function 20 by lines 50. The multifunction display also interfaces with the keyboard unit 16, which may be a standard keyboard unit, by lines 51. The keyboard unit 16 is also wired into the communication apparatus 24 by lines 52. Control lines 54 are connected from the ASE integration functions 21 to the decoy dispenser 18.

Figure 2:
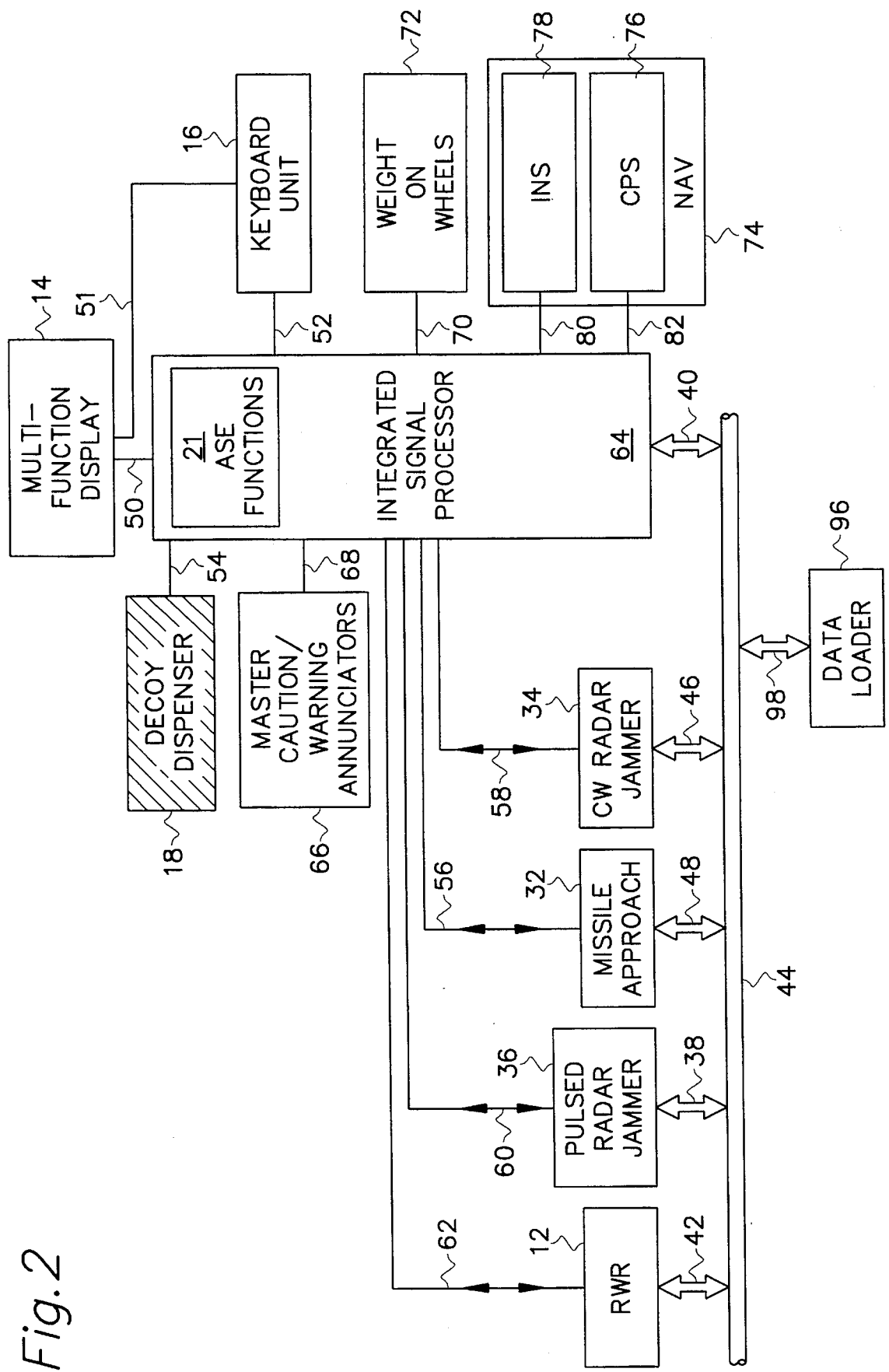
FIG. 2 shows a more detailed block diagram of the aircraft survivability equipment integration system 10 which is integrated into an aircraft survivability equipment/avionics control system (ASE/ACS).

Now referring to FIG. 2, a more detailed block diagram of the aircraft survivability equipment integration system is shown as integrated into an aircraft survivability equipment/ avionics control system (ASE/ACS). The aircraft survivability equipment/avionics control system is used to integrate control and display of an ASE suite of devices such as the radar warning detector and jammers as well as selected military communication and navigation systems. Those skilled in the art will understand that the configuration shown in the block diagram of FIG. 2 is one example and does not so limit the invention. In the system shown in FIG. 2, the aircraft survivability integration functions 21 is embedded in an integrated signal processor 64. The integrated signal processor 64 may advantageously comprise a microprocessor, digital signal processor or an equivalent device. Also connected to the integrated signal processor 64 is a master caution/warning annunciator 66 which is connected to the integrated signal processor 64 by line 68, a weight on wheels sensor 72 which is connected by line 70, and navigation systems 74 which are connected by lines 80 and 82. The navigation equipment advantageously includes an inertial navigation system (INS) 78 and a global positioning system (GPS) 76. A data loader 96 is connected via lines 98 to bus 44. The data loader 96 is a conventional data loader and may be used to input flight information and other parameters into the signal processor 64 prior to an aircraft embarking on a particular flight plan. The other components are as shown in FIG. 1 and operate similarly. Those skilled in the art will recognize that the ASE equipment including the radar warning sensor, jammers and missile approach detector are well known standard units.

The weight on wheels sensor 72 is a known sensor which communicates with the signal processor 64 and provides an enable signal 70 which enables certain built-in test functions to be performed when the aircraft is on the ground. These built-in test functions may be a part of the radar warning receiver 12, the pulsed radar jammer 36, the missile approach detector 32 and the continuous wave radar jammer 34.

The integrated signal processor 64 also serves as a bus controller using well known control signals. The four ASE subsystems, RWR 12, pulsed radar jammer 36, missile approach detector 32 and CW radar jammer 34 may be advantageously configured as remote terminals.

The ASE/ACS system provides a fail active state with regard to the ASE suite. If, for example, the integrated signal processor 64 should fail, or power is removed from the unit, the ASE subsystems may assume their most active states. The ability to fire flares and chaff is not impaired by a data bus failure in this redundant configuration. In order to insure this, flare and chaff fire switches are wired directly into the decoy dispenser 18 and are not controlled by the ASE/ACS in the event of a data bus failure. In the alternative, the decoy dispenser 18 may be fired automatically through the aircraft survivability integration functions 21 when an appropriate signal is received from any one or more of the subsystem sensors, such as the radar warning receiver.

Figure 6:
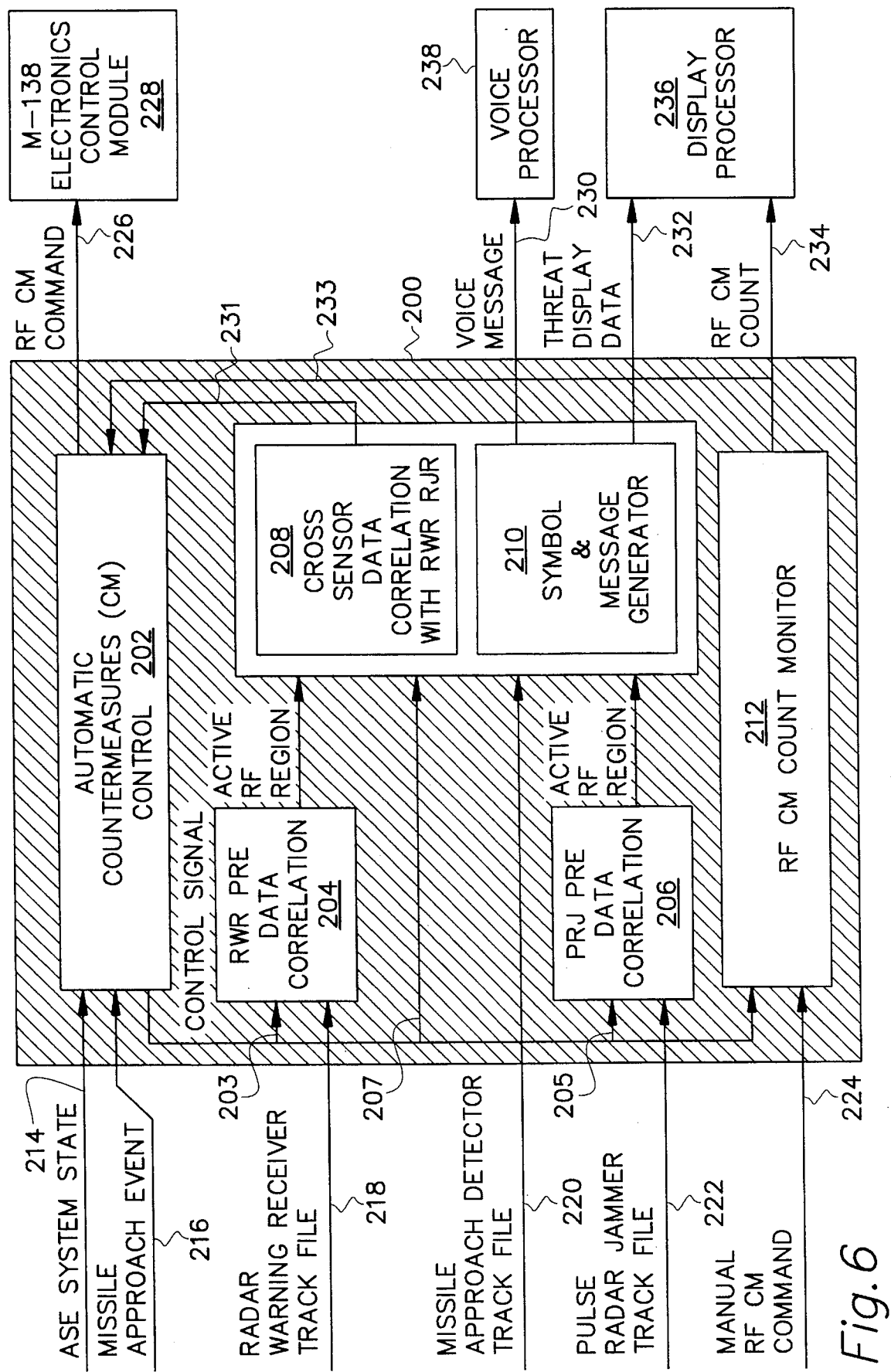
FIG. 6 shows a schematic block diagram for the automatic RF countermeasures dispensing module apparatus of the invention.

FIG. 6 shows the automatic RF countermeasures dispensing module apparatus of the invention. The apparatus of the invention comprises six different functional components. The first component is the automatic countermeasures control apparatus 202; the second is the RWR pre-data correlation apparatus 204; the third is the PRJ pre-data correlation apparatus 206; the fourth is the RF-CM count monitor 212; the fifth is the cross-sensor data correlator 208; and the sixth is the symbol and message generator 210.

The automatic countermeasures control apparatus 202 receives an aircraft survivability system state input 214 and a missile approach event input 216. The automatic countermeasures control module also receives a input from the cross sensor data correlator 208 on the RF_CM counter monitor 212. The radar warning receiver pre-data correlator 204 receives a control signal input from the automatic countermeasures control module 202 and information from the radar warning receiver track file on signal line 218. The pulsed radar jammer pre-data correlation apparatus 206 receives control signals from the automatic countermeasures control module 202 and data from the pulsed radar jammer track file on signal line 222. The cross sensor data correlator 208 receives the active RF region signal from the radar warning receiver pre-data correlation apparatus 204. The cross data correlation sensor also receives control signals from the automatic countermeasures control module 202. The missile approach detector track file 220 is provided to the cross sensor data correlation apparatus 208 and the symbol message generator 210. The active RF region from the pulsed radar jammer pre-data correlator 206 is also provided to the cross sensor data correlator 208 and the symbol message generator 210. The RF_CM count monitor 212 is provided with control signals from the automatic countermeasures control module 202 and also receives a signal noting the number of manual countermeasures initiated on the manual RF_CM command signal line 224. The number of total countermeasures is provided on RF_CM count line 234. The symbol message generator 210 provides voice messages on voice message line 230 to voice processor 238 and threat symbol display to the display processor 236 on threat symbol display line 232. A countermeasures initiation command 226 is provided to a countermeasures control module 228.

The automatic countermeasures control apparatus 202 generates control signals responsive to the ASE system state signal 214 and the missile alert event signal 216. The automatic countermeasures control apparatus 202 reads the ASE system state signal 214 which is set to indicate whether the Missile Approach Detector, Radar Warning Receiver, and Pulsed Radar Jammer are a part of the ASE suite operation. Depending upon the configuration indicated by the state signal 214, the automatic countermeasures control apparatus 202 generates control signals to activate the RWR pre-data correlator 204 and the PRJ pre-data correlator 206 as is appropriate. If the Missile Approach Detector and either the Radar Warning Receiver or Pulsed Radar Jammer are in operation, then the Missile Approach event 216 is monitored. If the Missile Approach event is active under the aforesaid conditions then the automatic countermeasures control apparatus 202 generates a control signal to activate the Cross-Sensor Data Correlator 208. The RF-CM count and the missile's correlated signal is monitored by apparatus 202 on lines 231 and 233 to generate a RF-CM command to dispense the countermeasures in accordance with the method described below.

The RWR pre-data correlator 204 is activated by a control signal 203 if the Missile Approach Detector and the Radar Warning Receiver are in operation. Threat information such as threat type, threat mode, and angle of arrival (AOA) is used to identify the "active-RF" region. The process is updated periodically upon availability of new RWR threat information. The output of this process is information about the "active-RF" regions.

The PRJ pre-data correlator 206 is activated by control signal 205 if the Missile Approach Detector and the Pulsed Radar Jammer are in operation. Threat information such as threat type, threat mode, and direction is used to identify the "active-RF" region. The process is updated periodically upon the availability of new PRJ threat information. The output of this process is information about the "active-RF" regions.

The RF-CM Count Monitor 212 keeps an accurate count of the number of RF decoys and amount of chaff remaining in the dispenser by monitoring the manual RF-CM command 224 as well as the automatic RF-CM command 226. The number of RF decoys and amount of chaff is presented on the display 236 for the flight crew.

The Cross-Sensor Data Correlator 208 is activated by control signal 207 by the Automatic Countermeasures Control apparatus 202 upon detecting a Missile Approach event 216. The invention correlates the "active-RF" region's information provided by the RWR pre-data correlator 204 and the PRJ predata correlator 206 with the missile information provided by the Missile Approach Detector track file 220. If the missile region is correlated with an "active-RF" region, then the invention generates a signal labeled as "Missile Correlated" and sends this signal to the automatic countermeasures control apparatus 202 on line 231 and the symbol and messages generator 210.

The symbol and message generator 210 first generates a voice message to warn the flight crew about the imminence of missile threat and then provides a threat symbol along with the screen position of the threat to a display system 236.

Figure 7:
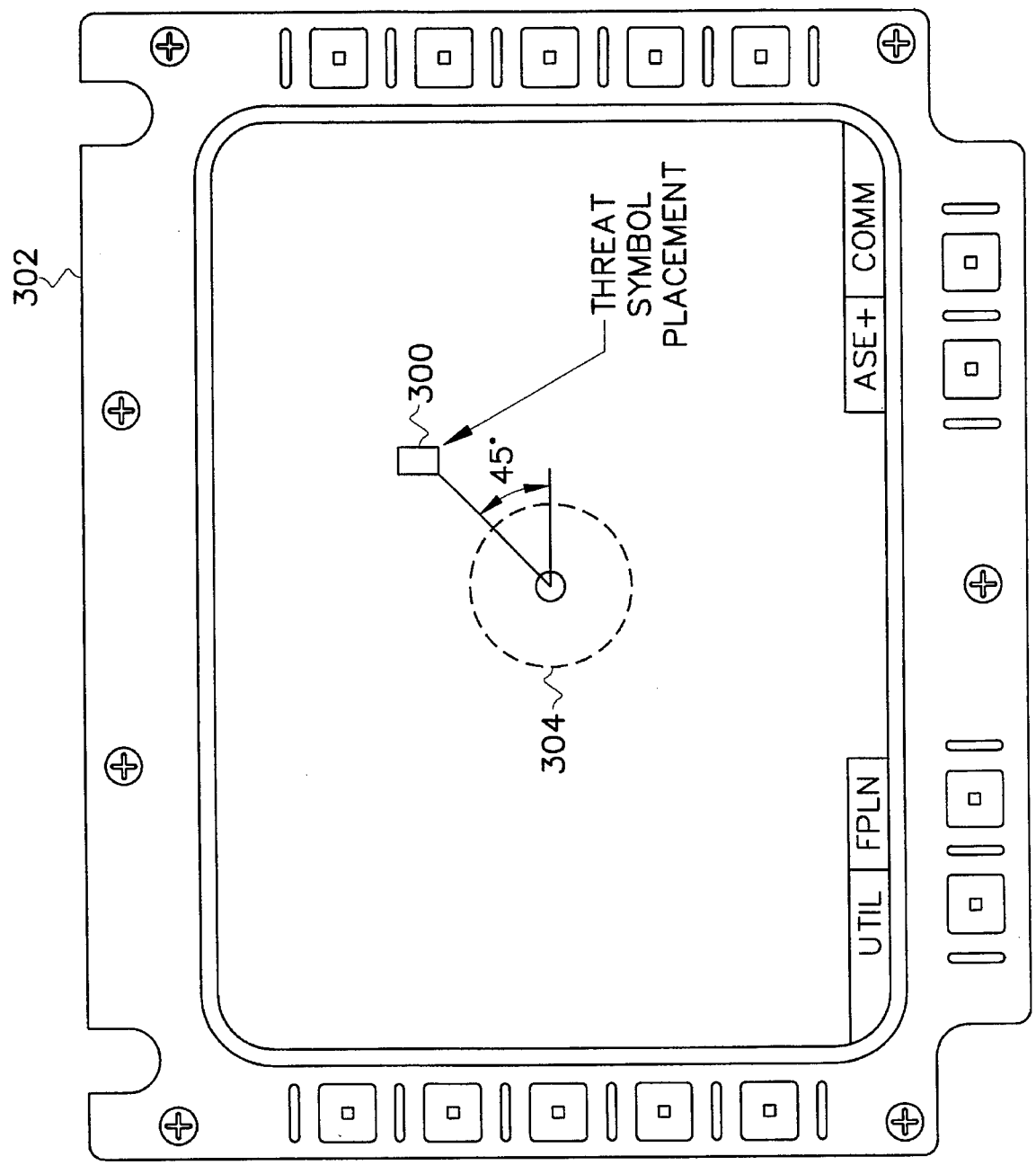
FIG. 7 shows a missile threat display for a multifunction display of the apparatus of the invention.

FIG. 7 illustrates a missile threat 300 coming from the first quadrant 304 displayed on the MFD 302.

Figure 8A:
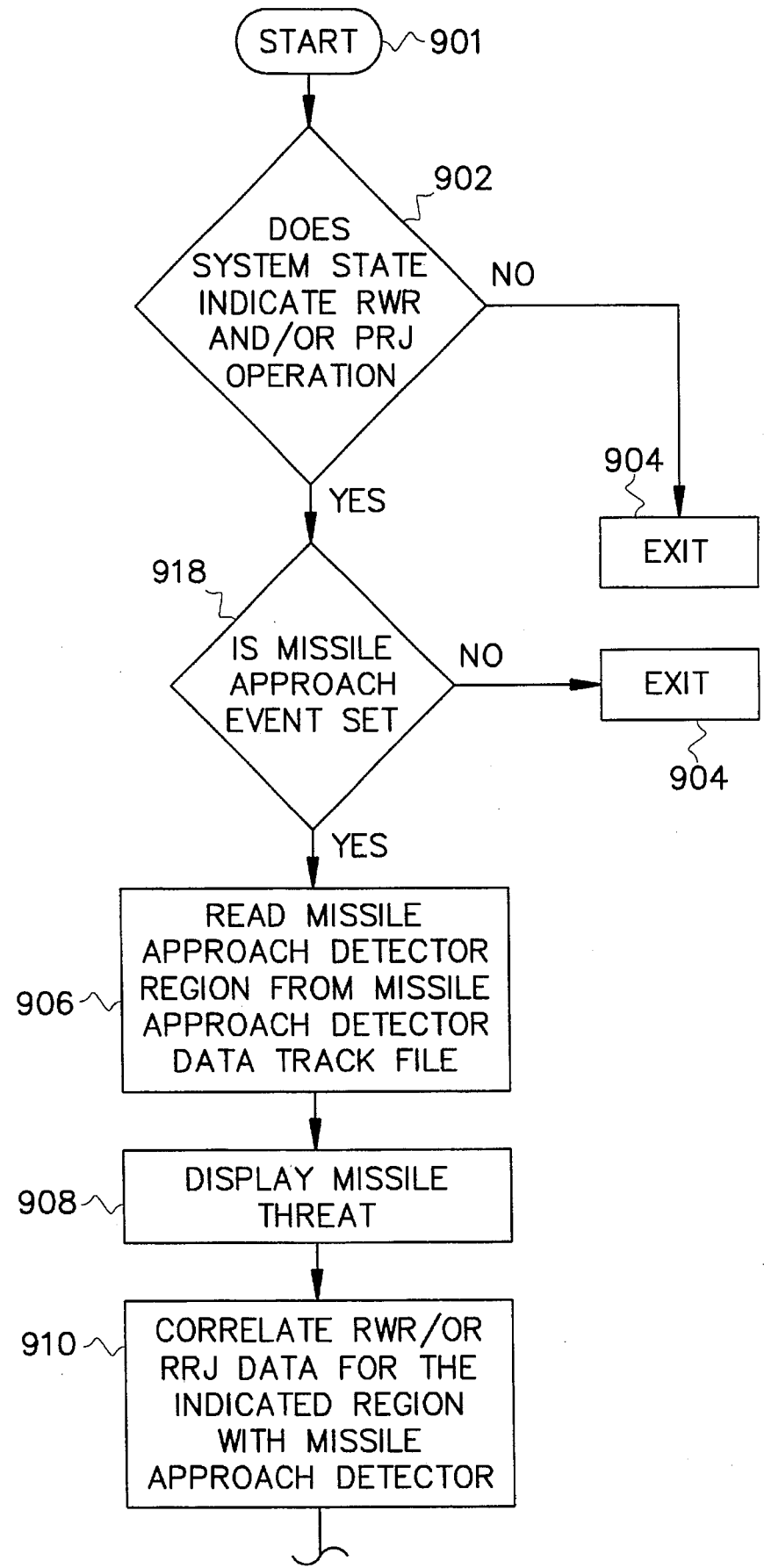
FIG. 8 shows a process flow diagram for the method of automatic countermeasures control of the invention.
Figure 8B:
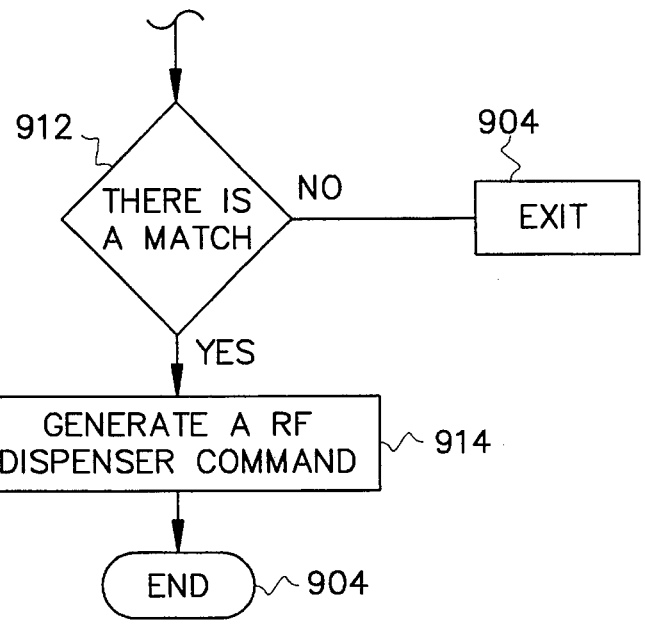

FIG. 8 shows the automatic countermeasures control module method of the invention. The automatic countermeasures control process starts at process step 901 with the initiation of the system. The process then flows to process step 902 to determine whether the system states indicate that the radar warning receiver or the radar jammer is in operation. If they are not in operation the process flows to process step 904 and exits. The process goes to step decision block 918 if the system state indicates that the radar warning receiver and a radar jammer is in operation. In process decision step 918, the missile approaching event is checked to see if it is set. If there is a missile approaching, the process flows to step 906. If there is no missile approaching, the process flows to step 904. The process then flows to step 906 if the missile is approaching. In process step 906 the missile approaching detector region is read from the missile approach detector data track file. The process then flows to step 908 to display the missile threat on the display. The display is further discussed in relation to FIG. 9. The process then flows to step 910 to correlate the radar warning receiver or the radar jammer for the indicated region with the missile approach detector. The process flows to decision block 912 to determine if there is a match between the radar warning receiver and the missile detector or the radar jammer and the missile detector. If there is no match, the process exits at 904. If there is a match, the process flows to 914 to generate a RF dispensing command to the countermeasures module. The process then flows to step 904 and ends. In one preferred embodiment of the invention the process repeats indefinitely until the mission is terminated.

Figure 9:
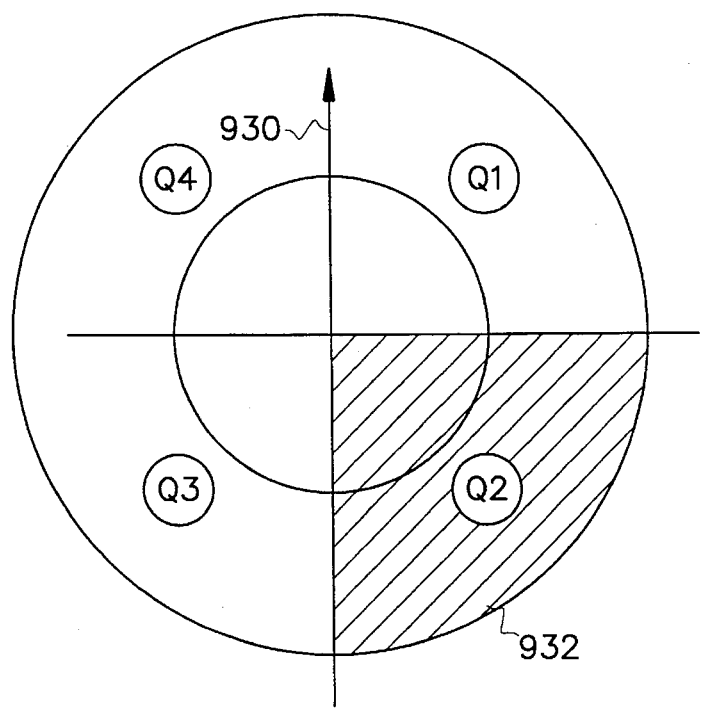
FIG. 9 shows a diagram of the four quadrants of a threat warning display showing the RF guided missile.

Now referring to FIG. 9 which shows a display format which indicates the four quadrants of interest over the Q1, Q2, Q3, and Q4 with the line of longitudinal axis of the aircraft indicated by line 930. The threat track is shown in shaded region 932 as coming from quadrant Q2.

Figure 3:
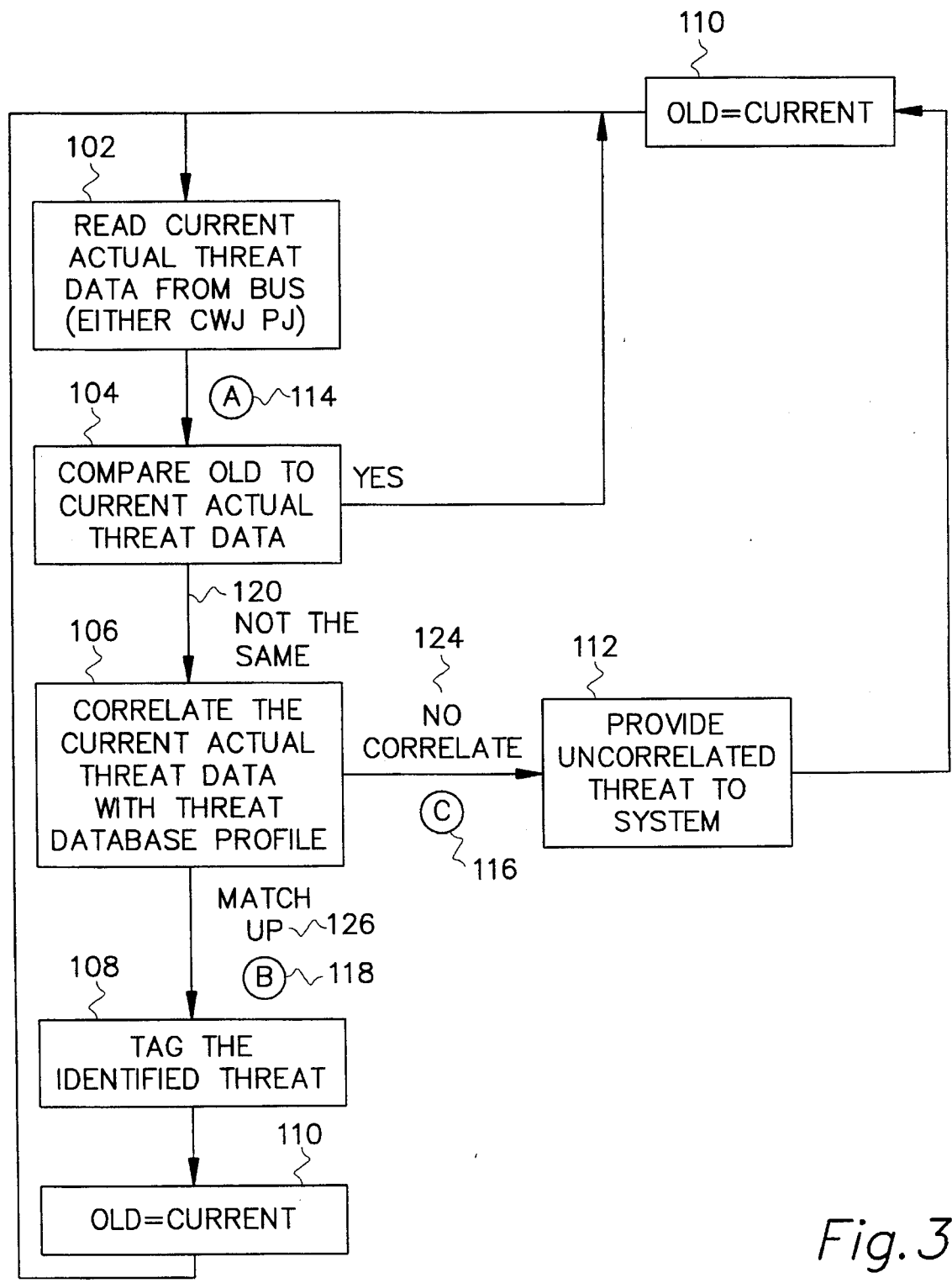
FIG. 3 shows a method of the invention that is used to convert the current actual threat data, that is sent to the system bus from either the continuous wave radar jammer or the pulsed radar jammer, to either an un-correlated threat or an identified threat.

Now referring to FIG. 3 which shows the method of the invention used to convert current actual threat data from the system data bus from either the continuous wave radar jammer or the pulsed radar jammer to either an un-correlated threat or an identified threat. The threat data base is composed of a number of sub-elements and parameters. A threat data base may be input into the system and stored in memory by any well-known means. The threat data base advantageously contains threat parameters including threat types which include, in one preferred embodiment of the invention, a missile, anti-aircraft gunfire, a fighter, or other threats identified by the aircraft. Each threat type has an associated set of parameters which, in one preferred embodiment of the invention, include frequency of the threat signal, amplitude of the threat signal, pulsed repetition frequency, pulsed repetition interval, angle of arrival, and operational mode of the threat. Those skilled in the art will recognize that other parameters may be used in the method of the invention. Those skilled in the art will recognize that either all the parameters may be included in the threat data base or just a few. The threat data base comprises a profile of known threats that may be encountered by the aircraft.

FIG. 3 shows the processing of data from a current actual threat as read from the jammer radars. The threat data is provided on the data bus 44 as shown in FIGS. 1 and 2. The process of the invention starts at step 102 wherein the current actual threat data from the data bus is read. This data is also available directly to the system processor 64 from the hardwired connections 58, 60 and from the radar jammers 34, 36. Those skilled in the art will recognize that the bus method of communication provides more robust threats. The process flows to step 104 where previously received old threat data is compared to just received current actual threat data. Step 104 compares on a logical basis the old detected threat and the current detected threat. The comparison of different threat data occurs in different time slices. The old threat data occurred at the last sample period as indicated in step 110. The comparison of the various threat data parameters can occur either through known accepted methods such as boolean comparisons or threshold comparisons which compare an upper bound to a lower bound of the parameters, or a comparison of whether or not the parameters are within a window of parameter values. Alternate methods of comparison understood by those skilled in the art may be used such as fuzzy logic-based comparisons. The process flows to step 106 if the system is in a state that indicates the old and the current actual threat data is not the same. At step 106 the process correlates the current actual threat data with threat profiles from the threat data base. In one preferred embodiment of the invention, the current actual threat is compared against each element of the threat data base using the comparison methods used in step 104. If the threats correlate and match up as indicated by state 126, the process flows to step 108 where the identified threat is tagged. The process then flows to step 110 to set the old actual threat data to equal the current actual threat data. The process then returns to step 102.

Figure 5:
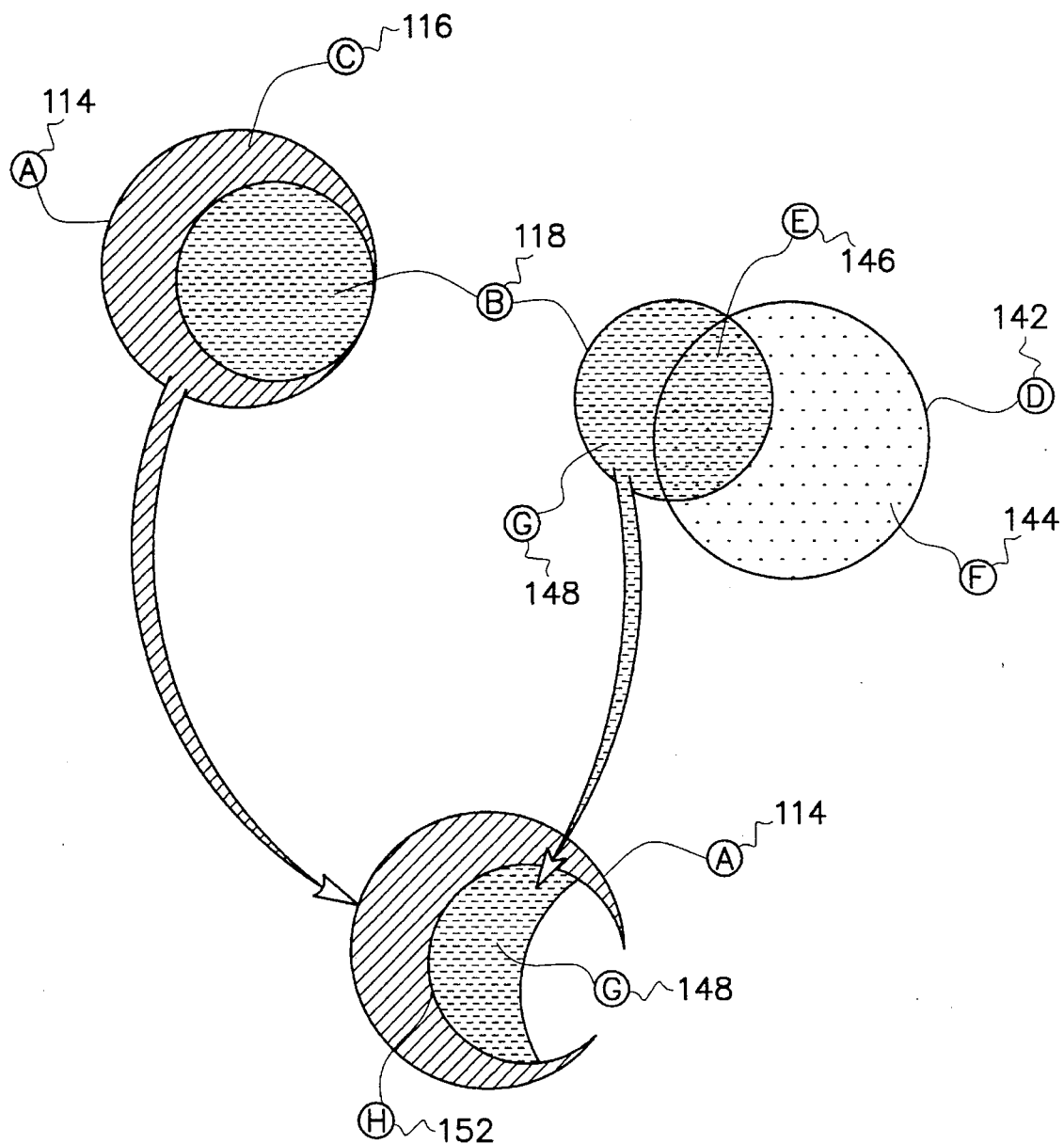
FIG. 5 shows a data flow diagram showing the various data sets of the invention in a Venn diagram fashion.

The processor creates different sets of data which are correlated as shown in FIG. 5 which is described in detail below. At step 102, the process takes data from one of the radar jammers which is designated as data set A 114. In step 106, a data set labeled C 116 is generated which represents an un-correlated current actual jammer threat data. This data is presented to process step 112 to provide un-correlated threat data to any system using the method of the invention. The process then flows to step 110 which sets the old threat data to the current threat data. Next, the process returns to step 102. The process step 106 generates a data set called B 118 which is the matched-up correlated current actual jammer threat data. If in process 104 the comparison to check old threat data against current threat data results in the old and the current being the same, then the process flows to step 102 to read the next current actual threat data from the bus or from the hardwired system.

Figure 4:
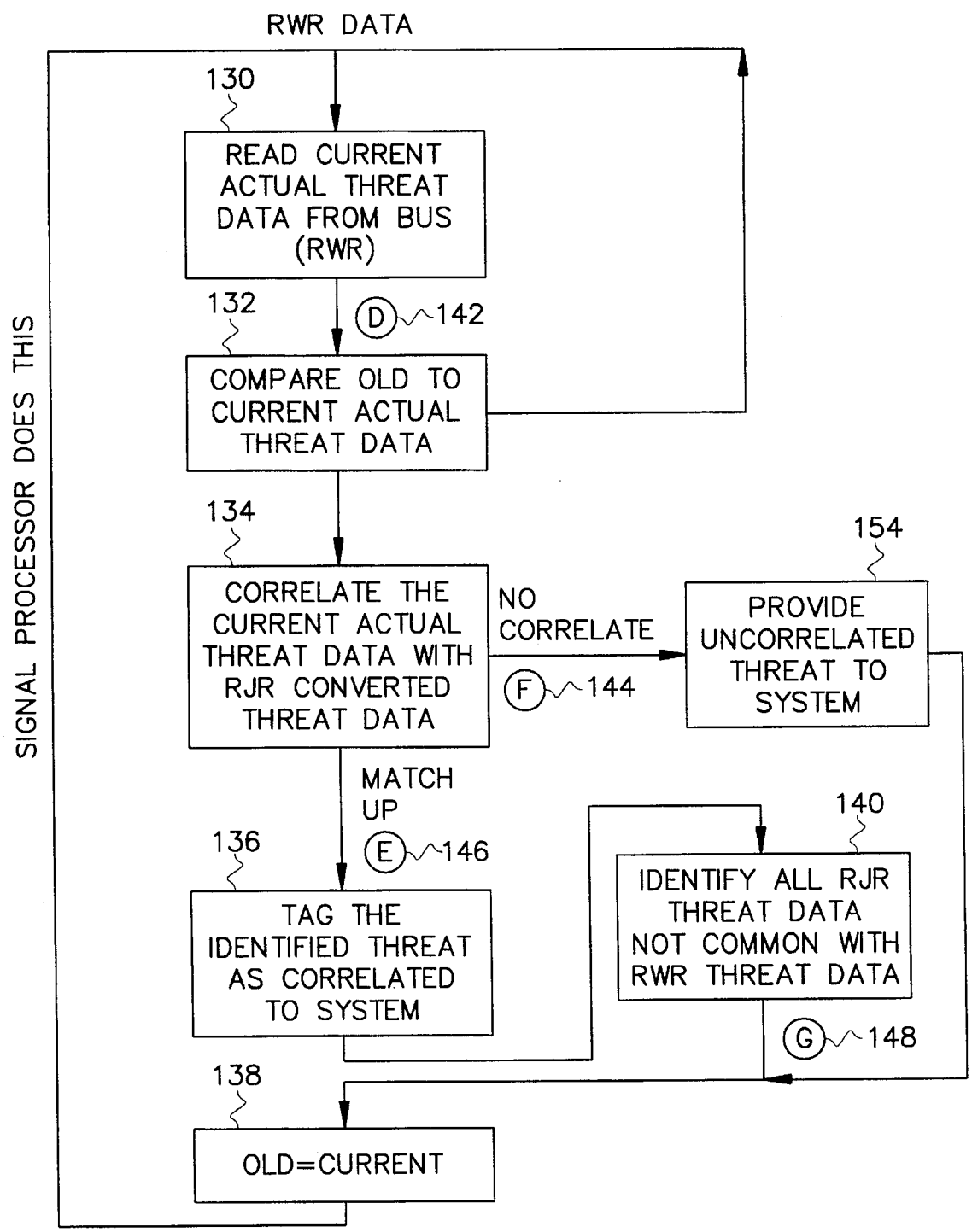
FIG. 4 shows one method of the invention used to perform data correlation on radar warning receiver data.

Referring now to FIG. 4, the method of the invention used to perform data correlation on radar warning receiver data is shown. The process starts at step 130 where the current actual threat data from the radar warning receiver is read from the data bus. The process 130 generates data set D 142. Data set D is then used by process step 132 to compare the current actual threat data with old threat data from the radar warning receiver. If the two threats are identical (i.e. the old and the current in step 132), the process returns to step 130 to read another actual threat. Step 130 reads in all available threats from the radar warning receiver. The set of all possible threats is commonly known as a threat set. In step 132, the old threat set is compared against a current actual threat set data. If the current actual threat set data is not a new threat set, then the process flows to 130 to scan another set of threats. In step 132, if there is a new threat, the process flows to step 134 to correlate the current actual threat set with the radar jamming receiver conferred threat data which is generated as shown in FIG. 3. The threat data is indicated by set B. If the converted threat data set B correlates with the current actual threat data set, then the process flows to 136 to tag the identified threat set as a correlated new threat to the system using the method of the invention. The process then flows to step 140 where the process identifies a set G 148 which is all radar jamming receiver threat data that is not common with the radar warning receiver threat data. The process then flows to step 138 to set the old threat data set as the current threat data set for the next comparison and the next time cycle. The process then flows to 130 to read the next current actual threat data set from the bus.

If in step 134 there is no correlation between the current actual threat data set with the radar jamming receiver converted threat data set, the process flows to step 154, generates an un-correlated threat set F 144, and provides the un-correlated threat set to the system using the method of the invention.

As is the case with the jammer data, when implementing the method of the invention to convert the current actual threat data set from the radar warning receiver to either a correlated or un-correlated threat, the process creates various other data sets. Data set D 142 is the current active threat data set from the bus. Data set E 146 is the correlated current actual threat data with the radar jamming receiver converted threat data. Data set F 144 is the un-correlated data. Data set G is the data which is not common with the radar warning receiver threat data 148.

Now referring to FIG. 5, a data flow diagram showing the various data sets of the invention in a Venn diagram fashion is shown. Data set A 114 is the current actual jammer threat data. Data set B 118 is the correlated current actual jammer threat data or the converted set data. Data set C 116 is the un-correlated actual jammer threat data. Data set D 142 is current actual radar warning receiver threat data. Data set E 146 is the common current threat data. Data set F 144 is the un-correlated radar warning receiver threat data. Data set G 148 is the radar jamming receiver threat data which is not common with the radar warning receiver threat data. Data set G is used subsequently to generate a complementary threat set H 152. Data set H 152 is the complimentary threat data set which represents the summation of data sets C and G.

The two basic processes shown in FIG. 3 and FIG. 4 are joined in this data flow diagram of FIG. 5. Two basic data sets include the data from the radar jamming receivers which is data set A 114, and the radar warning receiver which is data set D 142. The process of FIG. 3 generates the data set B 118 which represents all correlated current actual jammer threat data sets. This is used by both processes shown in FIG. 3 and FIG. 4 to create a complimentary threat. The data set B 118 is subtracted from data set A 114 to generate data set C 116 which is the un-correlated current actual jammer threat data. Data set B 118 is also used along with the data set D 142 (current actual radar warning receiver threat data) to generate the intersection of the two data sets E 146. The data set E 146 is the common current threat data. The common current threat data is then subtracted from data set B 118 to generate a new data set G 148. Data set G 148 represents the radar jamming receiver threat data that is not common with the radar warning receiver threat data. That is, data set G 148 represents data from threats which are detected by the jammers, but not the radar warning receiver. Data set G 148 and data set C 116 are combined to create data set H which is called the complementary threat data. The complementary threat data set H comprises threats that are complementary to the already identified threats which have been identified by the radar warning receiver.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An automatic RF countermeasures dispensing module comprising:
   (a) automatic countermeasures control means having an aircraft survivability system state input, a missile approach event input, an RF countermeasures command output, a control signal output, a cross-sensor data correlation input and a countermeasures count monitor input;
   (b) radar warning receiver pre-data correlation means having a control signal input operatively connected to the control signal output of said automatic countermeasures control means and a radar warning receiver track file input, said radar warning receiver pre-data correlation means providing an active RF region output;
   (c) pulsed radar jammer pre-data correlation means having a pulsed radar jammer control input operatively connected to the control signal output of said automatic countermeasures control means and a pulsed radar jammer track file input, said pulsed radar jammer pre-data correlation means having active RF region output;

(d) RF countermeasures count monitor means having an RF count monitor control signal input operatively connected to the control signal output of said automatic countermeasures control means and a manual RF countermeasures command count input, said RF countermeasures count monitor means providing an RF countermeasures count output;

(e) cross sensor data correlation means having an active RF region input operatively connected to the active RF region output of said radar warning receiver pre-data correlation means, an active RF region input connected to said output of said pulsed radar jammer pre-data correlation means, a missile approach detector track file input, and a cross sensor data correlation control input operatively connected to the control signal output of said automatic countermeasures control means, said cross sensor data correlation means providing cross sensor data correlation with said RF active region output of said radar warning receiver pre-data correlation means and said active RF region output of said pulsed radar jammer pre-data correlation means and with said missile approach detector track file input means, said cross sensor data correlation means outputting to said correlated data input of said automatic countermeasures control means;

(f) symbol and message generator means having a control signal input operatively connected to the control signal output of said automatic countermeasures control means and operatively connected to said cross sensor data correlation means, said symbol and message generator means providing a threat display data output and a voice message output; and (g) voice processor means operatively connected to said voice message output and display processor means for displaying threat data operatively connected to said threat display data output and said RF countermeasures count output.

2. An automatic countermeasures control method comprising the steps of:

(a) determining if a system state indicates either a radar warning receiver or pulsed radar jammer is in operation, exiting the process if neither is in operation;

(b) determining whether a missile is approaching, exiting the process of no missile is approaching;

(c) reading a missile approach detector region from a missile approach detector data track file;

(d) displaying a missile threat;

(e) correlating data from a radar warning receiver or a pulsed radar jammer for an indicated region with the missile approach detector data track file;

(f) determining if there is a match, exiting the process if there is no match; and (g) generating an RF dispensing command indicative of the missile approach.

3. An integrated aircraft survivability equipment apparatus comprising:

(a) data bus means having a data bus control input;

(b) means for aircraft survivability integration comprising an automatic countermeasures dispensing control output, a multifunction display output, a data bus control output connected to said data bus control input, a radar warning receiver control output, a pulsed radar jammer control output, a continuous wave radar jammer control output, and a missile approach detector control output;

(c) radar warning receiver means operatively connected to said data bus means and having a radar warning receiver control input operatively connected to said radar warning receiver control output of said aircraft survivability integration means;

(d) pulsed radar jammer means operatively connected to said data bus means and having a pulsed radar jammer control input operatively connected to the pulsed radar jammer control output of said aircraft survivability integration means;

(e) continuous wave radar jammer means operatively connected to said data bus means and having a continuous wave radar jammer control input operatively connected to said continuous wave radar jammer control output of said aircraft survivability integration means;

(f) missile approach detector means operatively connected to said data bus means and having a missile approach detector control input operatively connected to said missile approach detector control output of said aircraft survivability integration means;

(g) multifunction display means having a multifunction display input operatively connected to said multifunction display output of said aircraft survivability integration means, said multifunction display means being operatively connected to a keyboard control unit; and (h) automatic countermeasures dispensing means having an automatic countermeasures dispensing input operatively connected to said automatic countermeasures dispensing control output of said aircraft survivability integration means.

4. The integrated aircraft survivability equipment apparatus of claim 3 wherein said means for aircraft survivability integration further comprises an automatic RF countermeasures dispensing module apparatus for dispensing countermeasures having an automatic RF countermeasures dispensing module apparatus input operatively connected to at least one of said radar warning receiver means, said pulsed radar jammer means, said continuous wave radar jammer means, or said missile approach detector means.

5. The integrated aircraft survivability equipment apparatus of claim 4 wherein said automatic RF countermeasures dispensing module apparatus further comprises an input for detecting aircraft survivability equipment system state.

6. The integrated aircraft survivability equipment apparatus of claim 5 wherein said automatic RF countermeasures dispensing module apparatus comprises means for dispensing an RF countermeasures command.

7. The integrated aircraft survivability equipment apparatus of claim 4 wherein said automatic RF countermeasures dispensing module apparatus comprises means for counting the countermeasures dispensed.

8. The integrated aircraft survivability equipment apparatus of claim 7 wherein said means for counting countermeasures dispensed comprises means for counting both the number of manually dispensed countermeasures and the number of automatically dispensed countermeasures.

9. The integrated aircraft survivability equipment apparatus of claim 4 wherein said automatic RF countermeasures dispensing module apparatus outputs to a voice processor means for generating voice messages concerning threat data.

10. The integrated aircraft survivability equipment apparatus of claim 8 wherein said automatic RF countermeasures dispensing module apparatus outputs to a voice processor means for generating voice messages concerning the count of countermeasures dispensed.

11. The integrated aircraft survivability equipment apparatus of claim 4 wherein said automatic RF countermeasures dispensing module apparatus outputs to a display processor for generating threat display.

12. The integrated aircraft survivability equipment apparatus of claim 8 wherein said automatic RF countermeasures dispensing module apparatus outputs to a display processor for displaying the count of countermeasures dispensed.

13. An apparatus for automatically dispensing countermeasures comprising:
  a missile approach detector and at least one other aircraft survivability sensor;
  means to correlate the missile approach detector output with the output of the at least one other aircraft survivability sensor to confirm a missile launch; and
  automatic countermeasures control means connected to the correlation means which upon detection of a missile approach, determines the status of the missile approach detector and the at least one aircraft survivability sensor, receives from the correlation means an indication of whether the missile has been correlated, and sends a signal to a countermeasures dispenser to dispense at least one type of countermeasure according to signals received from the correlation means.

14. The apparatus of claim 13 further comprising means for maintaining a count of countermeasures dispensed which operatively connected to said automatic countermeasures control means.

15. The apparatus of claim 14 wherein said means for maintaining a count of countermeasures dispensed maintains a count of the number of manually dispensed countermeasures and maintains a count of the number of automatically dispensed countermeasures dispensed by the automatic countermeasures control means.

16. The apparatus of claim 13 further comprising symbol and message generator means which provides threat information for a missile detection.

17. The apparatus of claim 16 wherein a voice processor for providing acoustic warnings for the threat information is connected to the symbol and message generator means.

18. The apparatus of claim 16 wherein a display processor for displaying the threat information is connected to the symbol and message generator means.

19. The apparatus of claim 13 wherein the at least one other aircraft survivability sensor is radar warning receiver.

20. The apparatus of claim 13 wherein the at least one other aircraft survivability sensor is a radar jammer.

* * * * *